(12) United States Patent
Schneider et al.

(10) Patent No.: US 6,808,198 B2
(45) Date of Patent: Oct. 26, 2004

(54) PILLAR-MOUNTED FRONTAL AIRBAG

(75) Inventors: David W. Schneider, Waterford, MI (US); Steven R. Fredin, Djursholm (SE)

(73) Assignee: Autoliv ASP, Inc., Ogden, UT (US)

( * ) Notice: Subject to any disclaimer, the term of this patent is extended or adjusted under 35 U.S.C. 154(b) by 99 days.

(21) Appl. No.: 10/104,209

(22) Filed: Mar. 20, 2002

(65) Prior Publication Data

US 2003/0178821 A1 Sep. 25, 2003

(51) Int. Cl.[7] .............................................. B60R 21/22
(52) U.S. Cl. ............................ 280/730.1; 280/743.1
(58) Field of Search .................... 280/730.1, 730.2, 280/736, 743.1, 743.2, 728, 728.2

(56) References Cited

U.S. PATENT DOCUMENTS

| 5,362,097 A | 11/1994 | Barske |
| 5,755,457 A | 5/1998 | Specht |
| 5,833,304 A | 11/1998 | Daniel et al. |
| 5,865,462 A | 2/1999 | Robins et al. |
| 5,921,576 A | 7/1999 | Sinnhuber |
| 5,924,721 A * | 7/1999 | Nakamura et al. ....... 280/730.2 |
| 5,924,723 A | 7/1999 | Brantman et al. |
| 6,073,960 A * | 6/2000 | Viano et al. ............. 280/730.1 |
| 6,106,000 A * | 8/2000 | Stewart .................. 280/728.2 |
| 6,152,485 A * | 11/2000 | Kato ......................... 280/749 |
| 6,382,660 B1 * | 5/2002 | Starner et al. ........... 280/728.2 |
| 6,575,496 B2 * | 6/2003 | Hess et al. ............... 280/730.2 |
| 2001/0040364 A1 * | 11/2001 | Viano et al. ............. 280/730.1 |

FOREIGN PATENT DOCUMENTS

JP        05038993 A  *  2/1993  .......... B60R/21/16

* cited by examiner

Primary Examiner—David R. Dunn
(74) Attorney, Agent, or Firm—Sally J. Brown

(57) ABSTRACT

A pillar-mounted airbag module is disclosed. The frontal airbag module of the invention includes an airbag cushion configured to be deployed from a pillar of a vehicle and an airbag inflator coupled to the airbag cushion, the airbag inflator being suitable for attachment to a pillar of a vehicle. The frontal airbag module of the invention is configured to deploy the airbag cushion laterally along a windshield of the vehicle and then to subsequently inflate the airbag cushion toward the vehicle occupant.

46 Claims, 5 Drawing Sheets

PILLAR-MOUNTED FRONTAL AIRBAG

BACKGROUND OF THE INVENTION

1. Field of the Invention

The present invention relates to inflatable airbags for protecting vehicle occupants during collision events. More specifically, the present invention relates to an airbag module configured to be installed in a support pillar of a vehicle.

2. Description of Related Art

Inflatable airbags enjoy widespread acceptance as passive passenger restraints for use in motor vehicles. Airbags have built a reputation of preventing numerous deaths and injuries over years of development, testing, and use. Studies show that in some instances, the use of frontally placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

In part as a result of benefits such as those described above, automakers are now required to install airbags in most new vehicles manufactured for sale in the United States. Many automobile manufacturers have turned this airbag technology requirement into a marketing tool. Enticed by the promise of added safety, vehicle purchasers frequently seek out vehicles with sophisticated airbag systems.

Airbags are often installed in the steering wheel and in the dashboard on the passenger's side of a car. These airbags are often large and thick because airbags are used for the primary deceleration of a vehicle occupant. In a large percentage of collisions the occupant is accelerated forward through the vehicle. Frontal airbags are generally constructed to inflate toward the vehicle occupant, often with significant force. Airbag systems are generally designed to protect an occupant in a specific space within the car in a specific set of predicted positions. When a vehicle occupant is not positioned in a predicted position, deployment of the airbag may cause injury to the occupant.

Frontal airbags are generally housed within the dashboard, steering wheel, or other similar interior panels of a vehicle, and are covered by a trim cover panel. The trim cover panel covers the compartment that contains the airbag module. Such airbag covers are typically made of rigid plastic, and are configured to open by the pressure from the deploying airbag. During deployment of the airbag, it is preferable to retain the airbag cover in at least partial attachment to the vehicle to prevent the airbag cover from flying loose in the passenger compartment. If the airbag cover were allowed to detach and freely move into the passenger compartment, it could cause injury to a passenger.

Airbags are generally linked to a control system within the vehicle that triggers their initiation when a collision occurs. This control system is often referred to as an electronic control unit (or "ECU"). The ECU includes a sensor that continuously monitors the acceleration and deceleration of the vehicle. This information is sent to a processor which processes it using an algorithm to determine if a deceleration experienced by the vehicle is a collision or not. If this accelerometer measures an abnormal deceleration, such as one caused by a collision event, it triggers the ignition of an airbag inflator.

When the processor of the ECU determines, based on a set of pre-determined criteria, that the vehicle is experiencing a collision, the ECU transmits an electrical current to an initiator assembly. The initiator assembly is in turn connected to an inflator that is coupled to the airbag module. The initiator activates the inflator. An inflator is a gas generator that typically uses a compressed or liquefied gas or mixture of gases, a solid fuel, or some combination of the two, to rapidly generate a large volume of inflation gas. This inflation gas is then channeled, often through a segment of specialized tubing called a gas guide, to the airbag. The gas inflates the airbag, allowing it to absorb the impact of the vehicle occupants and thus prevent possible injury.

Following the activation of the airbag system and the deceleration of any vehicle occupants, the airbags rapidly deflate to release the vehicle occupants. Some airbags may be fully inflated within 50 thousandths of a second, and subsequently deflated within two tenths of a second.

As experience with the manufacture and use of airbags has progressed, the engineering challenges involved in their design, construction, and use have become better understood. First, most airbag systems are designed to rapidly inflate and provide a cushion in front of or alongside an occupant based on a presumption that the occupant will be in a predetermined position. Problems have been noted to occur when the occupant is "out of position" with regard to this presumed placement when a collision event occurs and the airbag deploys. Similarly, problems may occur when the occupant, though possibly at first in the predicted position, strikes a glancing blow to the airbag, and is then deflected out of the airbag before proper deceleration can occur.

Other out-of-position injuries occur when an occupant is positioned within the inflation path of the airbag. In such cases, the occupant may be struck by the airbag when it inflates, in some cases causing substantial injury to the occupant. Airbags currently used in the art inflate with significant force in order to be inflated and in place in a very short period of time. Part of the problem may be attributed to the fact that most airbags inflate directly toward the occupant.

Additional problems in airbag use involve effective coverage of potential impact surfaces of a vehicle interior by airbags. Many of the known airbags effectively protect the occupant from contact with regions of the dashboard, the windshield, and often, the steering wheel. One area more difficult to protect traditionally has been the vehicle's A-pillar. This rigid pillar carries potential to cause serious injury to a vehicle occupant during a collision event.

Other problems faced in the development and use of airbags include costs encountered in providing a proper housing and attachment for airbags. Many dashboard- and steering wheel-mounted airbags require the use of housings separate from the structure of the vehicle itself for convenient use, thus raising the cost of use of the airbags. It would be an advancement in the art to provide an airbag mounted and housed within the structure of the vehicle to reduce the cost of airbags.

Finally, with airbags mounted in dashboards, doors, steering wheels, etc., considerable damage is often caused to the mounting panel by deployment of the airbag. Specifically, in dashboard-mounted systems, deployment often causes sufficient damage to the instrument panel of the vehicle to merit complete replacement.

Accordingly, the need exists for a pillar-mounted frontal airbag system to better protect a vehicle occupant. Such a system could protect the vehicle occupant in a wide variety of collision events, including those requiring better shielding of the A-pillar. Specifically, it would be an advancement in the art to provide a pillar-mounted frontal airbag suitable for mounting in a vehicle in the A-pillar of the vehicle, the airbag module requiring reduced housing and attachment means and reducing the need for instrument panel replacement after airbag deployment. Finally, it would be an advancement in the art to provide an airbag which reduces the incidence of out-of-position injuries by deploying first along the dashboard of a vehicle, and then deploying toward the occupant, thus contacting the occupant (if at all) with greatly reduced inflation force. Such a device is disclosed and claimed herein.

SUMMARY OF THE INVENTION

The apparatus of the present invention has been developed in response to the present state of the art, and in particular, in response to the problems and needs in the art that have not yet been fully solved by currently available airbag modules. Thus, it is an overall objective of the present invention to provide a pillar-mounted airbag module for protecting a vehicle occupant.

To achieve the foregoing objective, and in accordance with the invention as embodied and broadly described herein in the preferred embodiment, a frontal airbag module for protecting a vehicle occupant is provided. The airbag module may include an inflator, and an airbag cushion having an inflation orifice, wherein the inflator is coupled to the airbag cushion at the inflation orifice. The airbag module is adapted to be installed into a side pillar of a vehicle. The airbag cushion is in some embodiments sufficiently elongated in shape such that when the airbag is installed in a side pillar of a vehicle, initiation of the inflator deploys the airbag cushion between a vehicle occupant and a structure of the vehicle.

The airbag cushion may be elongate in shape. Specifically, the airbag cushion may be made elongated in shape such that when it inflates, it reaches from its site of installation, such as the A-pillar, to the center of the vehicle. Additionally, the inflation orifice may be placed at an end of the airbag which is used for mounting the airbag.

The airbag cushion may be constructed of multiple panels. Specifically, the cushion may comprise an upper panel, a lower panel, and a central panel. The central panel of such an airbag cushion may additionally include an inflation orifice. This inflation orifice may simply comprise a narrowed throat region of the airbag.

According to the present invention, the frontal airbag module may include an airbag cushion configured to be a driver's side airbag cushion. Such a module would be installed in the A-pillar nearest the seat of the vehicle driver. Alternatively, the frontal airbag module of the present invention may include an airbag cushion configured to be a passenger's side airbag cushion. Such a module would be installed in the A-pillar nearest the seat of the front-seat passenger. The invention may also be made suitable for use in the other pillars of a vehicle, such as the B, C, and D pillars.

Additionally, the frontal airbag module of the invention further may comprise at least one tether to assist in the proper positioning of the airbag cushion upon inflation. Tethers may be positioned internally within the airbag cushion to direct its inflation direction, path, and shape, as well as externally to further direct the inflation path and configuration, as shown in FIG. 2.

The frontal airbag modules of the invention also include an airbag inflator for inflating, and thus deploying, the airbag cushion briefly described above. Such an inflator may be substantially cylindrical in shape so as to be most easily accommodated within the pillar of the vehicle. Additionally, the airbag inflator may be either a single-stage airbag inflator or a dual-stage airbag inflator.

The pillar-mounted frontal airbag module of the invention may also include a trim panel. The trim panel is configured to be attached to the other components of the airbag module as well as to the pillar of the vehicle to which the assembly is to be mounted. This trim panel encloses the airbag and inflator. The trim panel also serves to allow the airbag to be integrated into the vehicle in a visually pleasing manner, since the trim panel can be constructed of materials similar in color and texture to those used in the interior of the vehicle in which the airbag is to be installed.

The trim panel of the airbag module is constructed to release the airbag upon initiation of the inflator, thus deploying the airbag into the cabin of the vehicle in a position in front of a vehicle occupant. This may be accomplished in several ways. The trim panel could be made releasable by equipping the trim panel with hinges and a releasable latch. Alternatively, the trim panel could be constructed so as to predictably rupture in such a manner that the airbag would be properly deployed. This could be accomplished by providing a trim panel with frangible portions such as a scored or perforated internal surface.

In addition to the features discussed above, it should be noted that the airbag module of the present invention is unique in its configuration, mounting location in a vehicle, and deployment method. Specifically, the airbag is configured to be installed completely within the A-pillar of a vehicle. The inflator and airbag nest within the A-pillar, and are releasably enclosed by the trim panel. By including the inflator within the A-pillar, the need for a gas guide or other similar intermediate tube between the inflator and the airbag itself is avoided. This may reduce the expense associated with manufacturing and installing the airbag.

In addition to the above-mentioned benefits, installation of the airbag module completely within the A-pillar allows increased flexibility in the design of the instrument panel, steering wheel, driver's side and passenger's side of the vehicle. Specifically, by removing the airbag module—both the airbag cushion and the airbag inflator—from the dashboard, space is left to add either additional features to the dashboard/instrument panel/glove compartment of the vehicle or to add greater flexibility to the design of the dashboard. Furthermore, the overall mass of inflator portion of the airbag module may be reduced in this scenario since the structure of the A-pillar eliminates the need for attachment brackets and additional securing reinforcements.

In addition, by removing the airbag from the instrument panel, the costs associated with repairing a vehicle after airbag deployment may be reduced by lowering the need for instrument panel replacement due to damage caused by airbag deployment.

The pillar-mounted airbag of the invention deploys when activated by a control unit linked to the inflator of the module. The airbag inflator is directly linked to the airbag cushion of the module. When activated, the inflator begins rapidly producing inflation gas, thus creating high internal pressures within the airbag module. At this point, the trim panel releases the airbag, either by opening along a hinged region, or by rupturing in a predictable manner. In either case, the folded airbag is deployed, thus allowing it to be inflated by the pressurized inflation gas being rapidly produced by the inflator.

The airbag cushion of the present invention is novel in that it is configured to deploy first laterally along a windshield toward the center of the vehicle in which it is installed, and then to subsequently inflate toward the occupant. More particularly, the airbag first inflates toward the center of the vehicle along the dashboard. Next, the airbag begins to expand outwardly toward the back of the vehicle. As this expansion continues, the airbag is deflected away from the windshield, and begins to swing outwardly away from the windshield. This, in addition to the expansion of the cushion backward toward the occupant, assists in properly positioning the cushion for use.

The airbag cushion of the invention is thus positioned in the A-pillar to deploy to prevent a vehicle occupant from striking a surface in front of the occupant such as a dashboard, steering wheel, or windshield. By deploying in this manner, much of the initial force with which the airbag is inflated is directed along a vector away from the occupants of the vehicle. This function reduces the possibility of airbag-caused injury to the vehicle occupant, and may additionally reduce the severity of such injuries when they do occur. This configuration further acts to prevent out-of-position injuries to a vehicle occupant by sweeping toward the occupant, as well as by being inflated toward the occupant more gently. Finally, the airbag module of the invention improves the coverage of the A-pillar by preventing possible occupant contact with the A-panel during a collision event.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

Figure 1:
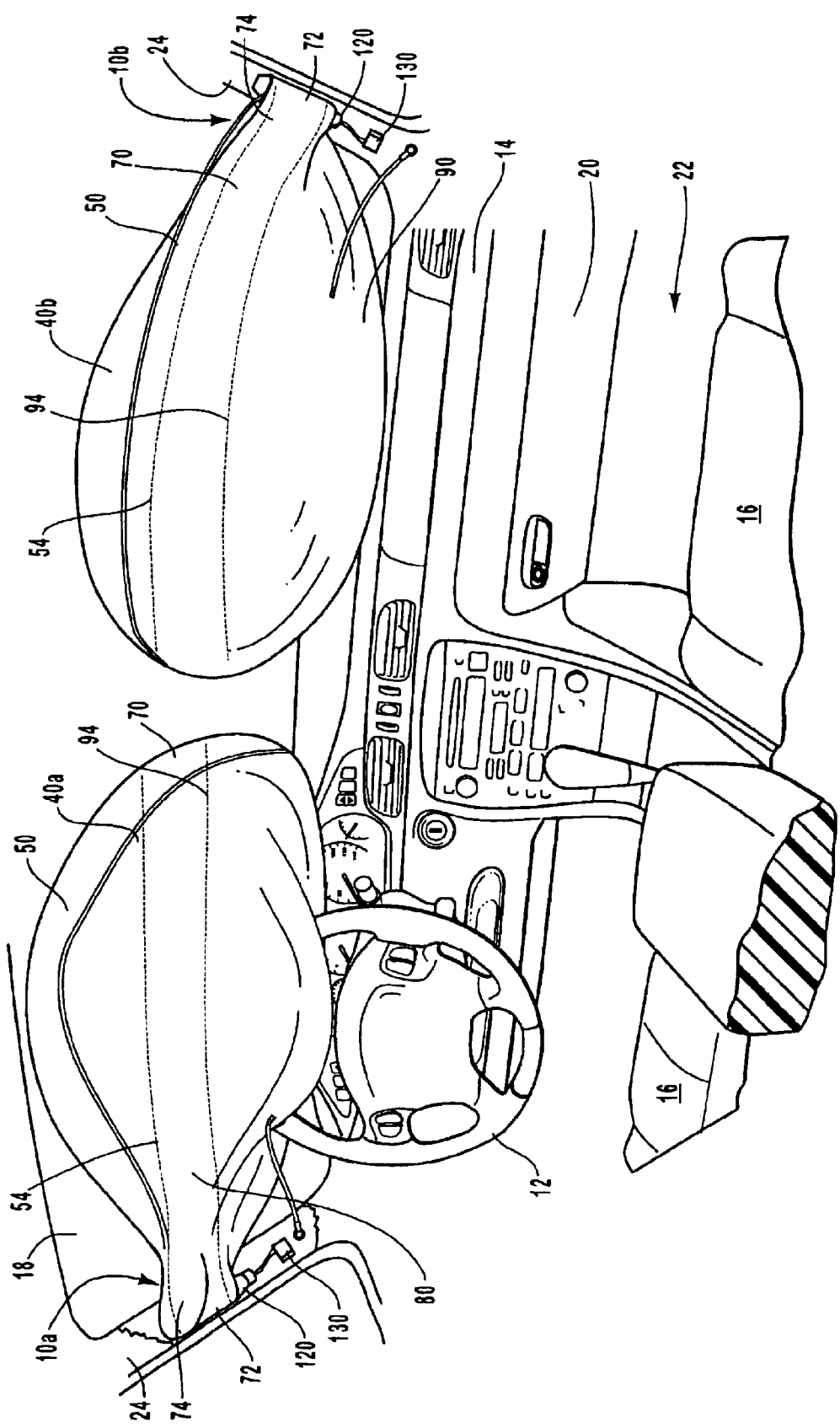
FIG. 1 is a perspective view of airbag modules of the invention shown mounted and inflated in a vehicle.

Referring now to FIG. 1, a vehicle 22 including pillar-mounted airbag systems according to the invention is shown. More specifically, the vehicle 22 is shown including the pillar-mounted frontal airbag system 10a of the invention in the driver's side A-pillar 24 and the system 10b similarly mounted in the passenger's side A-pillar 26. Here, the airbag cushions 40a and 40b of the system 10 are shown deployed and inflated.

The systems 10a and 10b are shown in FIG. 1 mounted in the driver's side A-pillar 24 and the passenger's side A-pillar 26. The systems 10a, 10b include an inflator 120, an airbag cushion 40a, 40b, and a trim panel (not shown). The airbag cushion 40a, 40b of the invention comprises an upper panel 50, a central panel 70, and a bottom panel 90. The upper panel 50 has a shape configured to conform to the windshield 18 of a vehicle along a back edge (not shown) of the upper panel 50. The upper panel 50 is attached to the central panel 70 along its periphery by upper peripheral seam 54. The airbag cushions 40a, 40b are thus seen to be elongated, as is portrayed in FIG. 1, such that each nearly stretches to the center of the dashboard, or vehicle. By being elongated thus, the airbags are made to be able to better protect vehicle occupants in a wider range of positions.

Additionally, the airbag cushions 40a, 40b additionally include an inflation orifice which is not shown in FIG. 1 for clarity. Visible, however, is that in FIG. 1, the airbag cushions 40a, 40b are attached to the inflators 120 on a side of the airbag cushions. This side is designated the mounting face of the cushion, and is preferably the site of the inflation orifice on the airbag cushion. The front face of the airbag cushion 40a, 40b intended for contact by the occupants is designated the contact face. This mounting face is located on a plane different from the contact face. In some embodiments, the mounting face is substantially perpendicular to the contact face.

The central panel 70 is preferably an elongate panel that is configured to be sewn into a loop. An upper edge of the central panel 70 is attached to the upper panel 50 at the upper peripheral seam 54; and a lower edge of the central panel 70 is attached to the lower panel 90 at a lower peripheral seam 94. The central panel 70 may be configured to control, in large part, the shape of the inflated airbag cushion 40a, 40b. Specifically, the central panel 70 may be configured such that when it is attached to the upper and lower panels 50, 90, it forms a loop. The central panel 70 may be shaped so as to provide a loop with a small width along its back face (not shown), which contacts the windshield 18 of the vehicle 22, and larger width along its front, or occupant-facing, face 80. In some variants of the airbag cushion 40 of the invention, this front face 80 of the central panel 70 is configured to be the panel primarily impacted by a vehicle occupant during a collision event.

The central panel 70 also generally includes an inflation orifice 72, to which an inflator 120 is attached, and through which inflation gases enter the airbag cushion 40a, 40b upon initiation of the inflator 120. The size and shape of the inflation orifice may be configured in various ways to influence the inflation rate, speed, and direction of the airbag during deployment. In some presently preferred embodiments of the pillar-mounted frontal airbag system of the invention, the inflation orifice 72 of the central panel 70 further includes a narrowed throat region 74, which extends outwardly from the central panel 70 to the inflator 120. This narrowed throat region 74 allows for space and more free movement between the A-pillar 24, 26 and the airbag cushion 40a, 40b. This narrowed throat region 74 may be formed by the ends of the central panel 70, or may alternatively be constructed from entirely separate components suitable for use in attaching the airbag and conducting inflation gas. The inflation orifice 72 may alternatively be placed in the upper and lower panels 50, 90.

The lower panel 90 of the airbag cushion 40 is designed to primarily contact the dashboard 14 and steering wheel 12 of the vehicle 22 and to place the front face 80 of the central panel 70 in proper position for contact by the vehicle occupant during a collision event. Similarly, the airbag cushion 40b deploying from the A-pillar 26 of the passenger's side of the vehicle has a bottom panel 90. This panel 90 is designed to contact the dashboard 14 of the vehicle and place the central panel 70 of the cushion 40 in a position such that the vehicle occupant would strike the central panel 70 in a collision event. The cushion 40b also has an upper panel 50 configured to contact the windshield 18 and direct the inflation of the cushion 40b outwardly toward the vehicle occupant.

Figure 2:
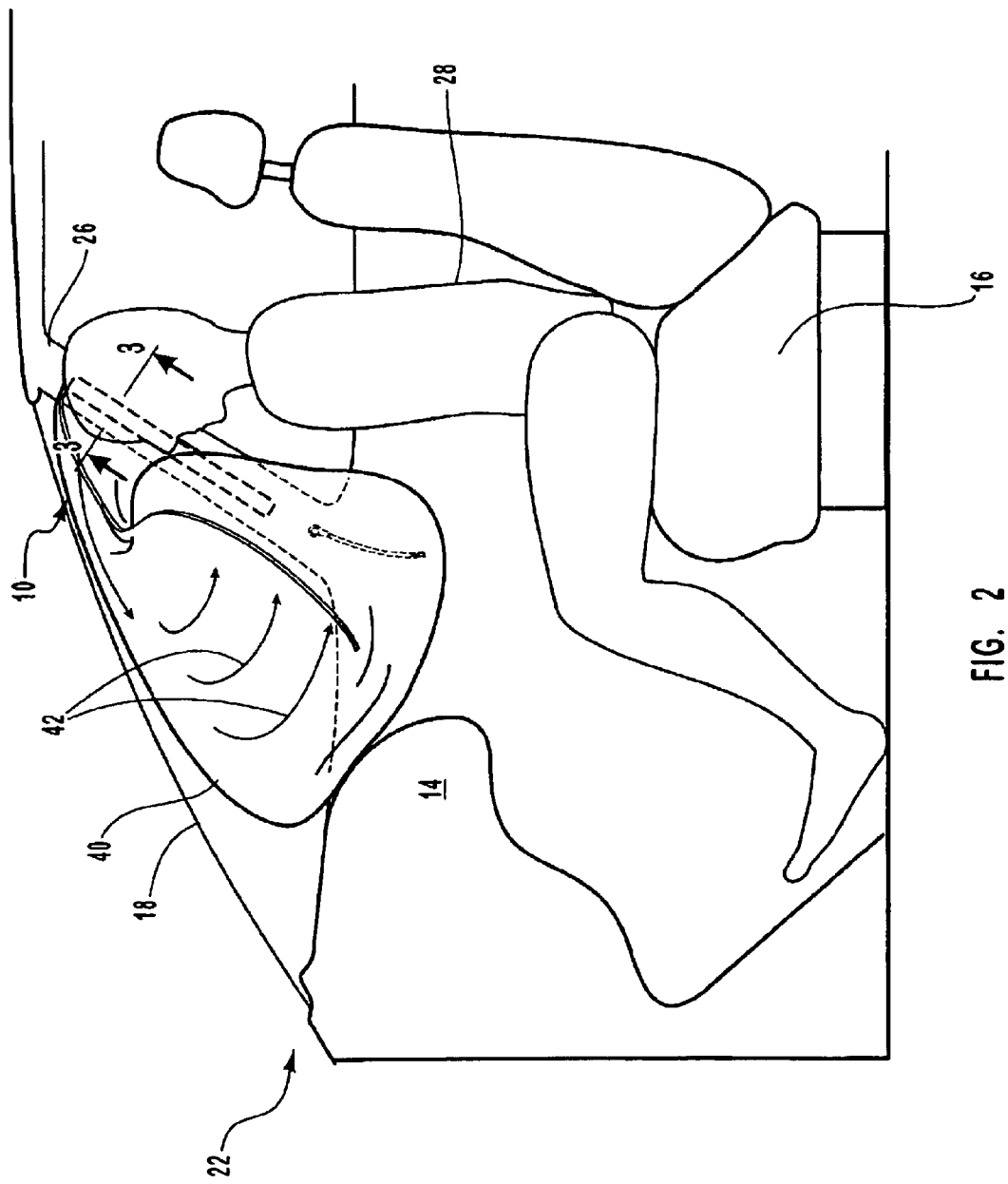
FIG. 2 is a cross sectional view of a vehicle showing an airbag module of the invention mounted and inflated in the vehicle in relation to a vehicle occupant.

Referring now to FIG. 2, a cross sectional view of a vehicle 22 showing an airbag module 10 of the invention mounted and inflated in the vehicle is shown. This figure shows the position of the module 10 and the airbag 40 in relation to a vehicle occupant 28. The figure also shows the movement of inflation gases 42 within the airbag 40 as they travel first outward along the dashboard 14 and windshield 18, and then are diverted toward the back of the vehicle 22 and the occupant 28 located in front seat 16. The airbag module 10 is mounted in A pillar 26.

Figure 3:
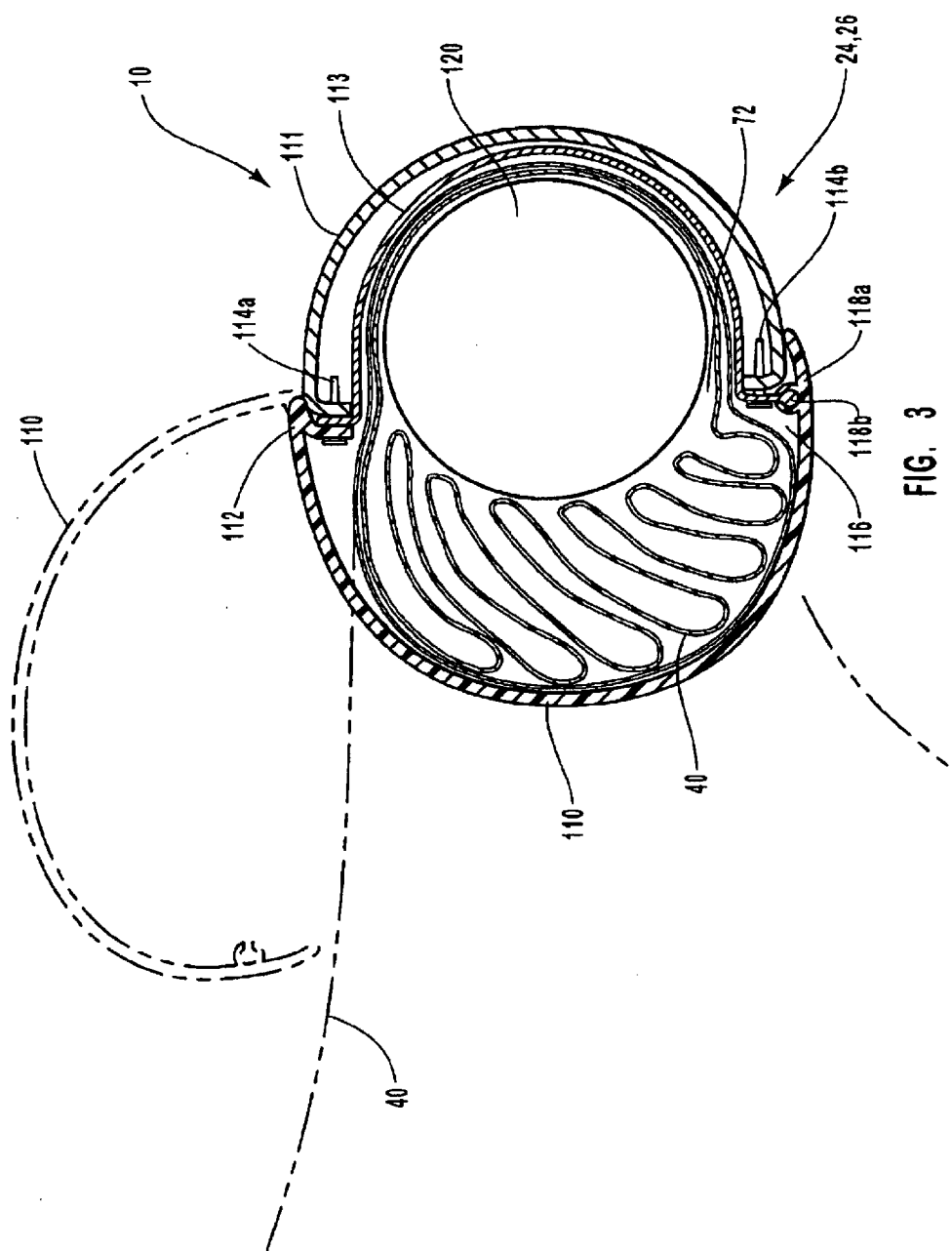
FIG. 3 is a cross-sectional view of the pillar-mounted frontal airbag system of the invention taken at line 3—3 of FIG. 2, shown in its stowed, compact configuration and in its deployed configuration (in phantom)

FIG. 3 shows a cross sectional view of an airbag module of the invention taken at line 3—3 of FIG. 2. In this figure, the airbag cushion 40 is depicted in both its stowed, compact configuration, and then partially (in phantom) in its deployed configuration.

The airbag cushion 40 is first shown deflated, folded, and stowed in chamber 116. This chamber 116 is defined on one side by pillar wall 111 and inner panel 113, and on the other by trim panel 110. Trim panel 110, inner panel 113, and pillar wall 111 unite to form A-pillar 24, 26. This is accomplished on one side by attaching a hinge region 112 of the trim panel 110 to the inner panel 113 and the pillar wall 111 by an attachment pin 114a. On the other side, a closure region of the trim panel 118a, here shown as a ball-in-socket closure, is releasably joined with a closure region of the inner panel 118b. Other suitable fasteners known in the art may be used. The inner panel 113 is joined to the pillar wall 111 by a second attachment pin 114b.

The airbag cushion 40 is attached to the inflator 120, via the inflation orifice 72. This may be accomplished using a variety of means known in the art, including positioning the inflator 120 over the inflation orifice 72, and fastening edges of the inflation orifice 72 around the back of the inflator 120 to a stud (not shown) and securing them with a bolt (not shown). The inflator 120 of the invention may be a single- or dual-stage inflator, and may use solid, liquid, and gaseous inflation gas generants, including pressurized gases and mixtures of gases in any combination (not shown).

In operation, the inflator 120 is initiated, thus expelling inflation gases into the airbag cushion 40, which begins to expand and inflate. The increase in pressure caused by this expansion eventually becomes sufficient to open the closure regions 118a, 118b of the inner panel 113 and the trim panel 110. After this, the trim panel 110 swings open, flexing along hinge region 112, as shown in FIG. 3 in phantom. This allows the airbag cushion 40 to inflate (partially shown in phantom).

The pillar-mounted frontal airbag system 10 is configured to be installed in A-pillars 24, 26; here shown to be made up of pillar wall 111, inner panel 113, and trim panel 110. These act to enclose the system 10. In this way, the system 10 occupies space that may otherwise go unused within the pillar 24, 26. The airbag system of the invention may also be configured to be installed in and deployed from other vehicular pillars such as the B pillars, C pillars, and D pillars. The system may be installed in the pillar using any of a variety of means known in the art, including, but not limited to, the use of tabs which can be bolted to the pillar structure, and snap-in fastening systems.

Figure 4:
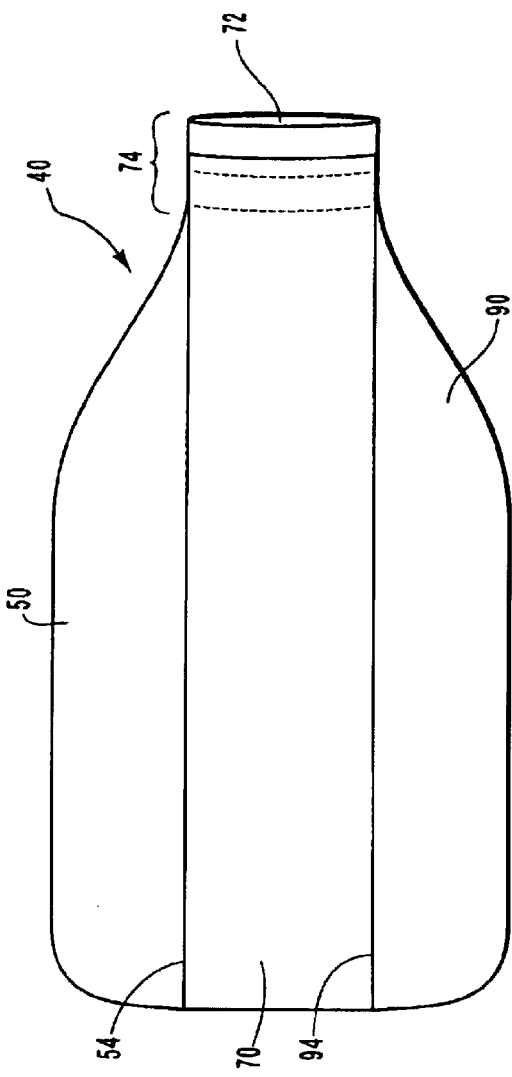
FIG. 4 is a side perspective view of an airbag of the invention shown flattened in preparation for folding.

FIGS. 4 through 7 schematically show steps of a preferred method of folding the airbag of the invention to assist in proper deployment of the airbag cushion 40 along the dashboard 14 of the vehicle 22 toward the center of the vehicle 22, and then toward the vehicle occupant 28. FIG. 4 shows the airbag 40, having upper panel 50, central panel 70, and lower panel 90, flattened, thus placing longitudinal folds in the upper panel 50 and the lower panel 90, and transverse folds in all three panels 50, 70, 90. As noted briefly above, the upper panel 50 is joined to the central panel 70 via the upper peripheral seam 54. The lower panel 90 is joined to the central panel 70 via the lower peripheral seam 94. The central panel 70 is shown here to include an inflation orifice 72 having a narrowed throat region 74.

Figure 5:
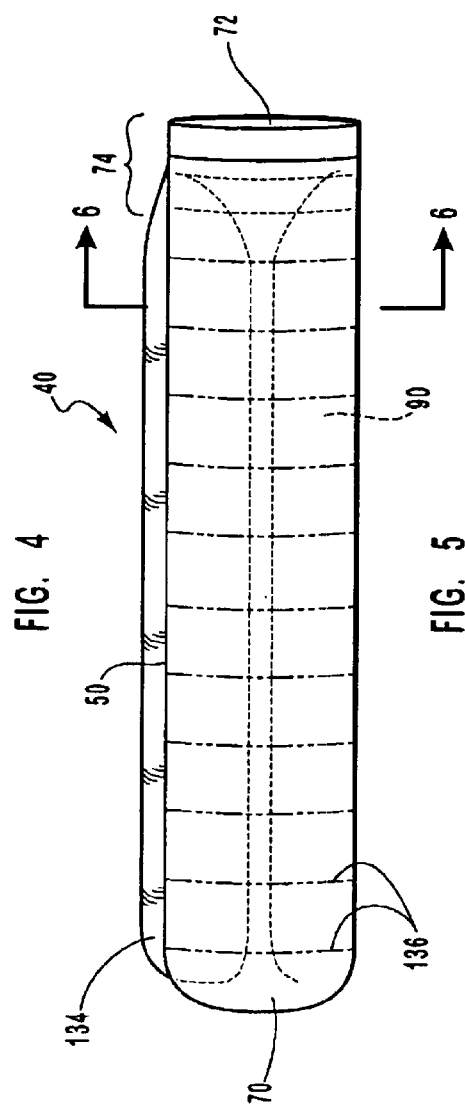
FIG. 5 is a side perspective view of an airbag of the invention having further folds to illustrate an intermediate step in the folding of the airbag prior to its insertion into an A-pillar of a vehicle.

FIG. 5 shows that in a subsequent folding step, the upper and lower panels 50, 90 are pleated longitudinally to form pleats 134. According to the invention, any suitable number of longitudinal pleats 134 may be used, but a number of longitudinal pleats from about one to about twenty is generally used, with from about 2 to about 8 longitudinal pleats being preferred. FIG. 5 further shows (in phantom) the transverse folds 136 added in the final folding step of the folding method.

Figure 6:
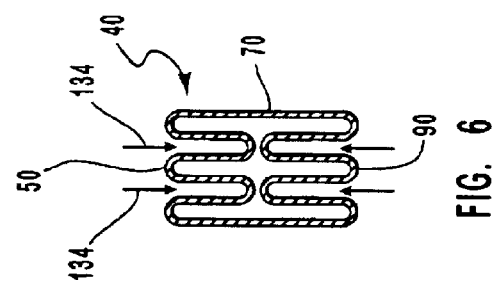
FIG. 6 is a cross sectional view of the partially-folded airbag of FIG. 5 taken at line 6—6.

FIG. 6 shows a cross-sectional view of the longitudinally pleated airbag 40 of FIG. 4 taken at line 6—6. In this figure, the airbag cushion 40 is shown folded such that the center panel 70 faces outwardly and the upper panel 50 and the lower panel 90 are folded. Specifically, the upper panel 50 and the lower panel 90 have longitudinal pleats 134. In this figure, each of the panels 50, 90 has two complete longitudinal pleats 134. These panels 50, 90 may alternatively comprise higher numbers of pleats to provide a more narrow, tubular product. Some cushions 40 have between 2 and 12 pleats, others have between 3 and 8 pleats, and still others have between 4 and 6 pleats.

Figure 7:
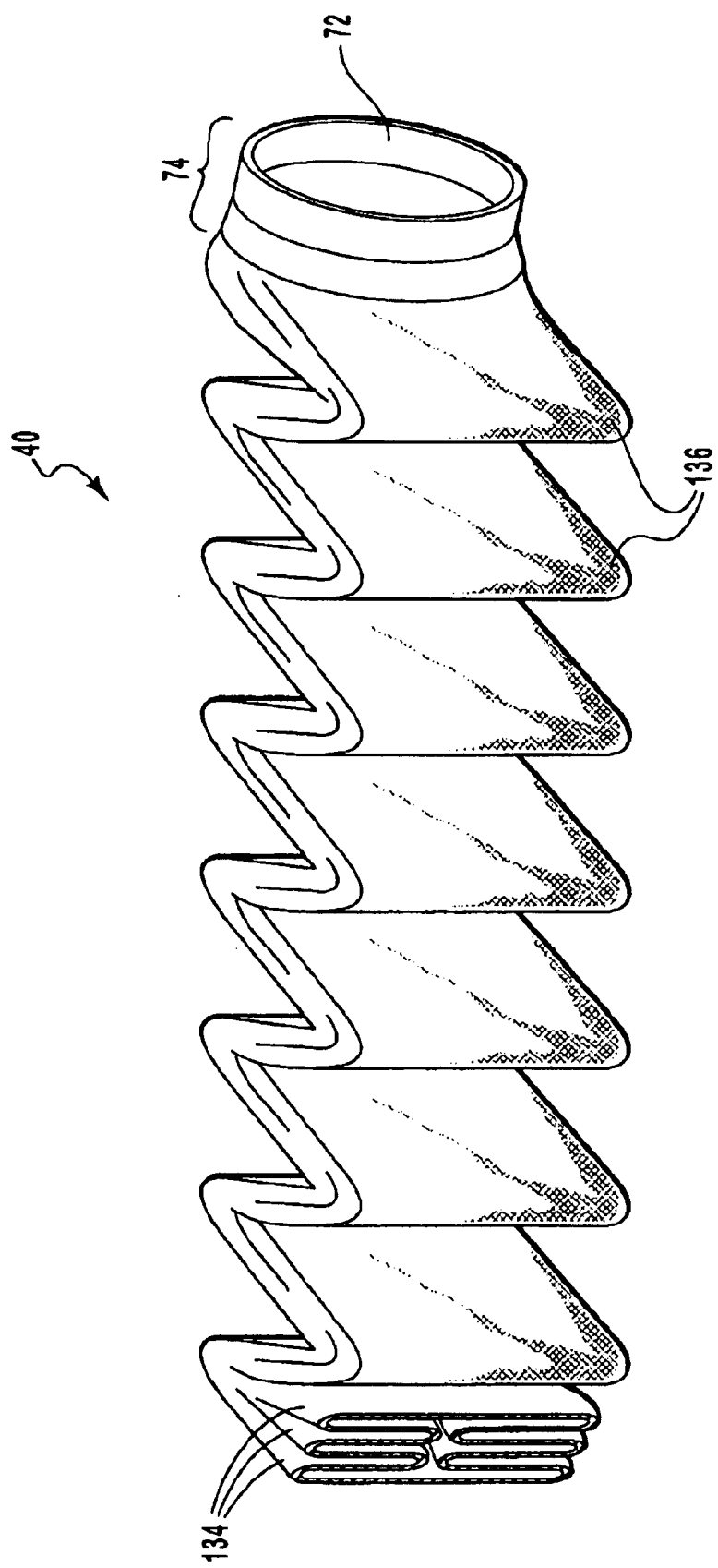
FIG. 7 is a side perspective view of the airbag of FIG. 5 exhibiting the folds resulting from the final folding step.

FIG. 7 shows a final step in the folding of the airbag cushion 40 of the invention. Specifically, the longitudinally pleated airbag of FIGS. 5 and 6 is here shown, having been transversely accordion-folded so as to guide proper inflation and allow the airbag 40 and inflator to be mounted within the chamber 116. FIG. 7 shows the longitudinal folds 134, the transverse folds 136, the narrowed throat region 74, and the inflation orifice 72.

The invention comprises a unique frontal airbag module with an alternative mounting location in the vehicle. The airbag module is attached to the pillar on the driver or passenger side of the vehicle. In preferred embodiments of the invention, the airbag module is configured to be mounted within the A-pillars of the vehicle. In alternative embodiments, however, the module may be configured to be mounted and deployed from other vehicle pillars such as, for example, the B, C, and D pillars. Upon receiving a signal from the airbag ECU, the airbag is triggered and initially inflates laterally along the windshield prior to inflating toward the occupant. This inflation sequence is beneficial for out-of-position occupants because the deployment forces are not directed toward the occupant, as with traditional airbags. A further advantage of this invention is the improved coverage of the A-pillar by the frontal airbag, to prevent occupant contact with a rigid pillar during a crash. The deployment pattern reduces the potential of the occupant to be out-of-position, and also reduces the potential of injury if the occupant is caught out-of-position.

Attachment to the A-pillar also allows increased flexibility in the design of the instrument panel (or steering wheel on the driver side). In addition, by using the structural A-pillar for module attachment, a reduction in overall mass can be achieved due to the elimination of airbag mounting brackets and reinforcements, normally required for sustaining the airbag deployment forces. Another advantage of the pillar-mounted airbag is the reduction in instrument panel replacement due to damage caused by airbag employment.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting a vehicle occupant, the airbag module comprising:
    an inflator; and
    an airbag cushion having an inflation orifice, wherein the inflator is coupled to the airbag cushion at the inflation orifice, the airbag module being adapted to be installed into a side pillar of a vehicle;
    wherein the airbag cushion is sufficiently elongated in shape and folded such that when the airbag module is installed in a side pillar of a vehicle, initiation of the inflator causes the airbag cushion to first inflate substantially laterally along a windshield of the vehicle between a vehicle occupant and a structure of the vehicle, and to subsequently inflate the airbag cushion substantially toward the vehicle occupant.

2. The airbag module of claim 1, wherein the airbag cushion comprises an upper panel coupled to a central panel that is coupled to a lower panel, wherein one of said panels includes the inflation orifice.

3. The airbag module of claim 2, wherein the inflation orifice is positioned in the central panel of the airbag cushion.

4. The airbag module of claim 3, wherein the inflation orifice comprises a narrowed throat region of the airbag cushion.

5. The airbag module of claim 1, wherein the airbag module is adapted to be installed into the A-pillar of the vehicle.

6. The airbag module of claim 1, wherein the airbag module is adapted to be installed into the B-pillar of the vehicle.

7. The airbag module of claim 1, wherein the airbag module is adapted to be installed into the C-pillar of the vehicle.

8. The airbag module of claim 1, further comprising a vehicular trim panel.

9. The airbag module of claim 1, wherein the airbag cushion is a driver's side airbag.

10. The airbag module of claim 1, wherein the airbag cushion is a passenger's side airbag.

11. The airbag module of claim 1, further comprising at least one tether to help properly position the airbag cushion during inflation.

12. The airbag module of claim 1, wherein the airbag inflator is substantially cylindrical in shape.

13. The airbag module of claim 1, wherein the airbag cushion is folded according to a method comprising the steps of:
    providing an elongated airbag having an inflation orifice on an outer edge of the airbag cushion, the airbag cushion comprising an upper panel, a lower panel, and a central panel;
    flattening said airbag by drawing the inflation orifice in a first direction and flattening the central panel moving away from the inflation orifice such that the central panel comprises a transverse fold at an end opposite the inflation orifice and the upper and lower panels are longitudinally folded;
    tucking the upper and lower panels inwardly toward the central panel to form at least one longitudinal pleat; and
    folding the airbag transversely beginning at the end opposite the inflation orifice to form at least one transverse fold, wherein said method of folding renders the airbag suitable for deployment from a vehicle pillar.

14. The airbag module of claim 13, wherein the method of folding an airbag results in at least two longitudinal pleats.

15. The airbag module of claim 13, wherein the method of folding an airbag results in at least two transverse folds.

16. An airbag module for protecting a vehicle occupant, the airbag module comprising:
    an inflator; and
    an airbag cushion having a mounting face, a contact face, and an inflation orifice, the mounting face being situated at an angle to the contact face, and the inflation orifice being positioned on said mounting face, wherein the inflator is coupled to the airbag cushion at the inflation orifice, the airbag module being adapted to be installed into a side pillar of a vehicle;
    wherein upon initiation of the inflator when the airbag module is folded and installed in a side pillar of a vehicle, the airbag cushion is caused to first inflate substantially laterally alone a windshield of the vehicle between a vehicle occupant and a structure of the vehicle and to subsequently deploy the airbag cushion substantially toward the vehicle occupant.

17. The airbag module of claim 16, wherein the airbag cushion comprises an upper panel coupled to a central panel which is coupled to a lower panel.

18. The airbag module of claim 17, wherein the central panel of the airbag cushion comprises the inflation orifice.

19. The airbag module of claim 18, wherein the inflation orifice comprises a narrowed throat region of the airbag cushion.

20. The airbag module of claim 16, wherein the airbag module is adapted to be installed into the A-pillar of the vehicle.

21. The airbag module of claim 16, wherein the airbag module is adapted to be installed into the B-pillar of the vehicle.

22. The airbag module of claim 16, wherein the airbag module is adapted to be installed into the C-pillar of the vehicle.

23. The airbag module of claim 16, further comprising a vehicular trim panel.

24. The airbag module of claim 16, wherein the airbag cushion is a driver's side airbag.

25. The airbag module of claim 16, wherein the airbag cushion is a passenger's side airbag.

26. The airbag module of claim 16, further comprising at least one tether to help properly position the airbag cushion during inflation.

27. The airbag module of claim 16, wherein the airbag inflator is substantially cylindrical in shape.

28. The airbag module of claim 16, wherein the airbag cushion is folded according to a method comprising the steps of:

providing an elongated airbag having an inflation orifice on an outer edge of the airbag cushion, the airbag cushion comprising an upper panel, a lower panel, and a central panel;

flattening said airbag by drawing the inflation orifice in a first direction and flattening the central panel moving away from the inflation orifice such that the central panel comprises a transverse fold at an end opposite the inflation orifice and the upper and lower panels are longitudinally folded;

tucking the upper and lower panels inwardly toward the central panel to form at least one longitudinal pleat; and folding the airbag transversely beginning at the end opposite the inflation orifice to form at least one transverse fold, wherein said method of folding renders the airbag suitable for deployment from a vehicle pillar.

29. The airbag module of claim 28, wherein the method of folding an airbag results in at least two longitudinal pleats.

30. The airbag module of claim 28, wherein the method of folding an airbag results in at least two transverse folds.

31. An airbag module for protecting a vehicle occupant, the airbag module comprising:

an elongated airbag cushion having an inflation orifice located on an outer edge of the airbag cushion; and an airbag inflator coupled to the inflation orifice of the airbag cushion, the airbag inflator being suitable for attachment to a side pillar of a vehicle;

wherein when installed in a side pillar of a vehicle, the airbag is folded such that initiation of the inflator causes the airbag cushion to first inflate substantially laterally along a windshield of the vehicle and then to subsequently inflate substantially toward the occupant.

32. The airbag module of claim 31, wherein the elongated airbag cushion comprises an upper panel, a lower panel, and a central panel.

33. The airbag module of claim 32, wherein the airbag cushion is configured to be a driver's side airbag cushion.

34. The airbag module of claim 32, wherein the airbag cushion is configured to be a passenger's side airbag cushion.

35. The airbag module of claim 32, wherein the central panel of the airbag further comprises the inflation orifice.

36. The airbag module of claim 31, wherein the airbag module further comprises a trim panel.

37. The airbag module of claim 31, wherein the airbag inflator is substantially cylindrical.

38. The airbag module of claim 31, wherein the airbag module further comprises at least one tether to help properly position the airbag cushion during inflation.

39. The airbag module of claim 31, wherein the airbag cushion is folded according to a method comprising the steps of:

providing an elongated airbag having an inflation orifice on an outer edge of the airbag cushion, the airbag cushion comprising an upper panel, a lower panel, and a central panel;

flattening said airbag by drawing the inflation orifice in a first direction and flattening the central panel moving away from the inflation orifice such that the central panel comprises a transverse fold at an end opposite the inflation orifice and the upper and lower panels are longitudinally folded;

tucking the upper and lower panels inwardly toward the central panel to form at least one longitudinal pleat; and folding the airbag transversely beginning at the end opposite the inflation orifice to form at least one transverse fold, wherein said method of folding renders the airbag suitable for deployment from a vehicle pillar.

40. The airbag module of claim 39, wherein the method of folding an airbag results in at least two longitudinal pleats.

41. The airbag module of claim 39, wherein the method of folding an airbag results in at least two transverse folds.

42. A method of decelerating a vehicle occupant during a collision event comprising deploying an elongated airbag cushion having an inflation orifice on a lateral face of the airbag cushion from a side pillar of a vehicle, wherein the airbag cushion deploys by first inflating substantially laterally along a windshield of the vehicle between the vehicle occupant and a structure of the vehicle, and then to subsequently inflate the airbag cushion substantially toward the vehicle occupant.

43. The method of claim 42, wherein the airbag cushion is deployed from the A pillar of the vehicle.

44. A method of decelerating a vehicle occupant during a collision event comprising the steps of:

providing an airbag module comprising an elongated airbag cushion having an inflation orifice on a lateral face of the airbag cushion and an airbag inflator coupled to the airbag cushion, the airbag inflator being configured to be attached to a pillar of a vehicle;

installing the airbag module in the pillar of a vehicle; and deploying the airbag cushion from the pillar of a vehicle during a collision event, wherein the airbag cushion first inflates substantially laterally along a windshield of the vehicle between a vehicle occupant and a structure of the vehicle and then subsequently inflates the airbag cushion substantially toward the vehicle occupant.

45. The method of claim 44, wherein the pillar is the A pillar of the vehicle.

46. The method of claim 44, wherein the airbag cushion comprises an upper panel, a central panel, and a lower panel.

* * * * *